United States Patent [19]

Rogers

[11] 3,988,136
[45] Oct. 26, 1976

[54] METHOD FOR REDUCING THERMALLY INDUCED FRACTURE OF CATHODE RAY TUBE BULBS DURING SALVAGE

[75] Inventor: Melvin F. Rogers, Western Springs, Ill.

[73] Assignee: Zenith Radio Corporation, Chicago, Ill.

[22] Filed: Apr. 17, 1975

[21] Appl. No.: 568,954

Related U.S. Application Data

[62] Division of Ser. No. 430,828, Jan. 4, 1974, Pat. No. 3,894,858.

[52] U.S. Cl. .................................. 65/23; 65/27; 65/28; 65/112; 65/113
[51] Int. Cl.² ................... C03B 23/00; C03B 19/00
[58] Field of Search ............... 65/23, 28, 112, 117, 65/27, 113

[56] References Cited
UNITED STATES PATENTS

| | | | |
|---|---|---|---|
| 3,350,188 | 10/1967 | Barrett et al. | 65/28 |
| 3,390,033 | 6/1968 | Brown | 65/23 |
| 3,929,443 | 12/1975 | Leuehberger et al. | 65/117 |

*Primary Examiner*—S. Leon Bashore
*Assistant Examiner*—Frank W. Miga
*Attorney, Agent, or Firm*—John H. Coult

[57] ABSTRACT

Method for reducing the likelihood of cathode ray tube glass bulb and bulb component fracture caused by temperature cycling during tube salvage. The depicted salvage method includes heating and then cooling the exterior surfaces of a glass front panel and glass funnel to be separated, thus producing a temperature gradient between the front panel extreme border and more remote inner portions of the front panel extreme border. This temperature gradient causes circumferential tension at the front panel extreme border. The circumferential tension is reduced to thus lessen, the likelihood of front panel fracture by applying, prior to or during, said cooling, a thermal insulator over the front panel extreme border and vicinity so as to locally reduce the rate of glass surface cooling.

8 Claims, 13 Drawing Figures

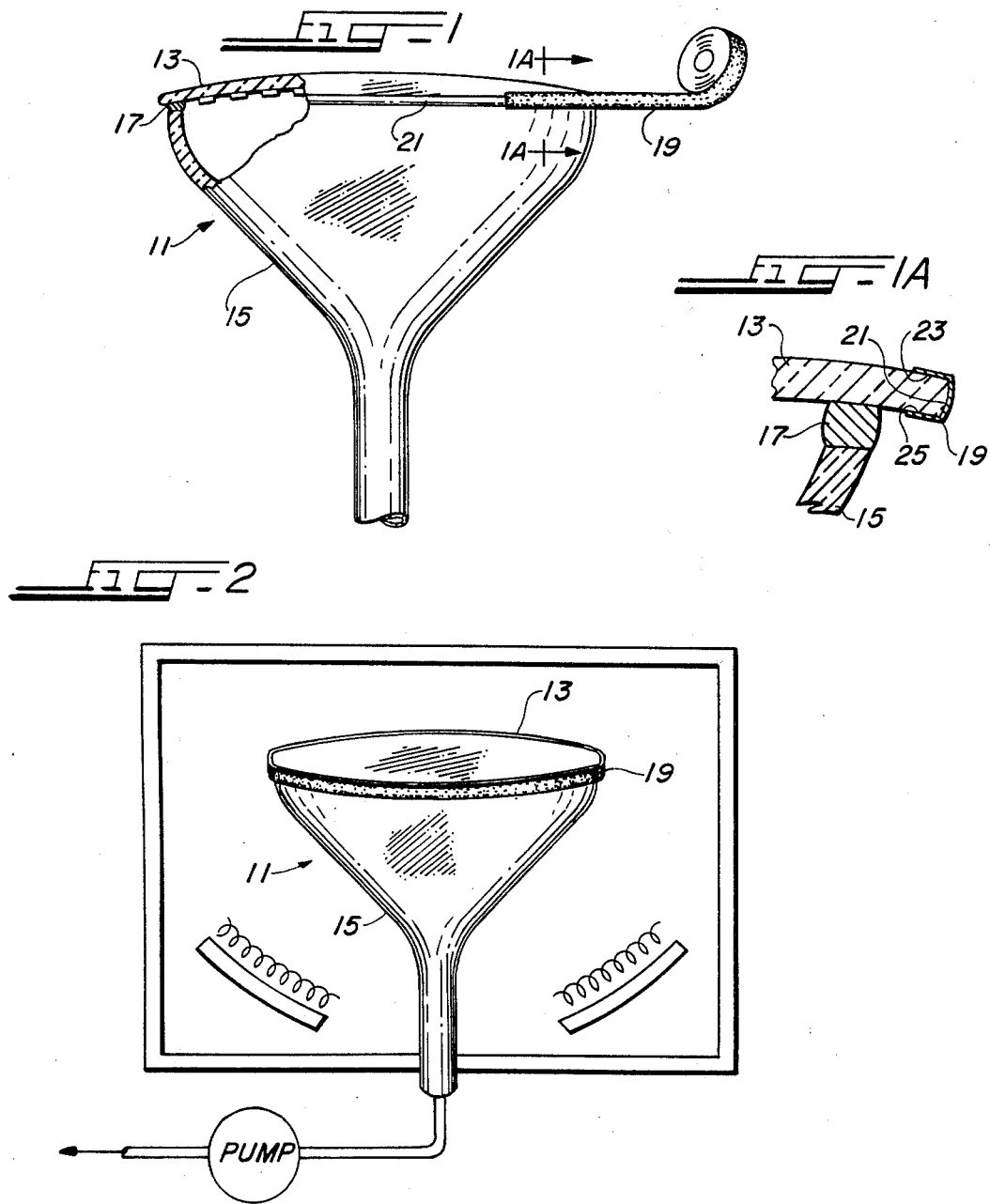

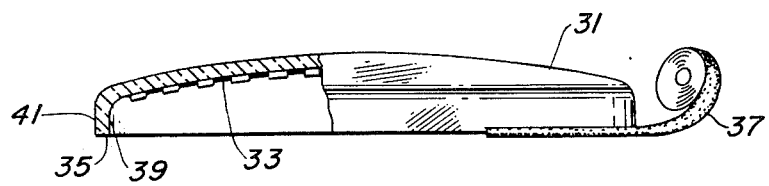
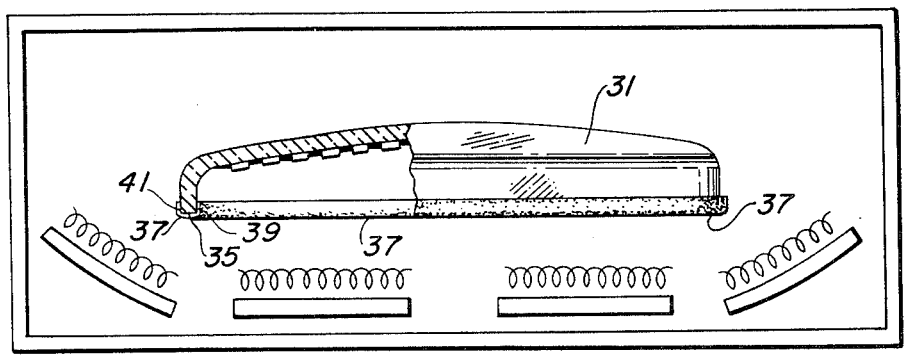
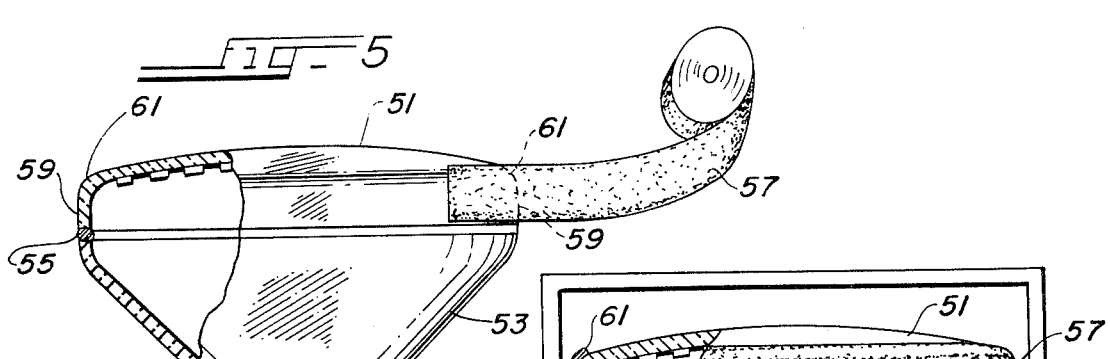
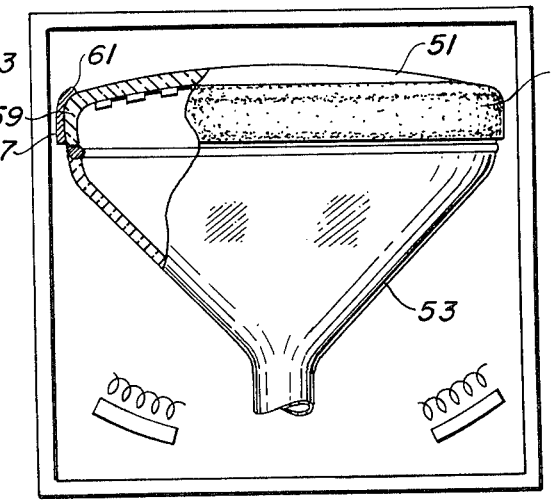

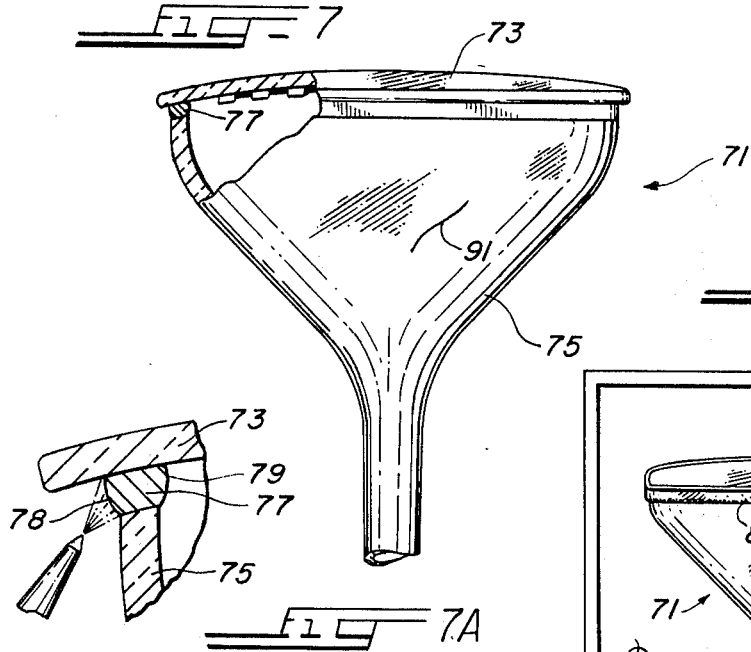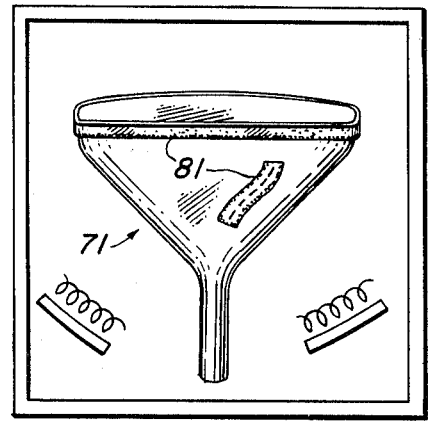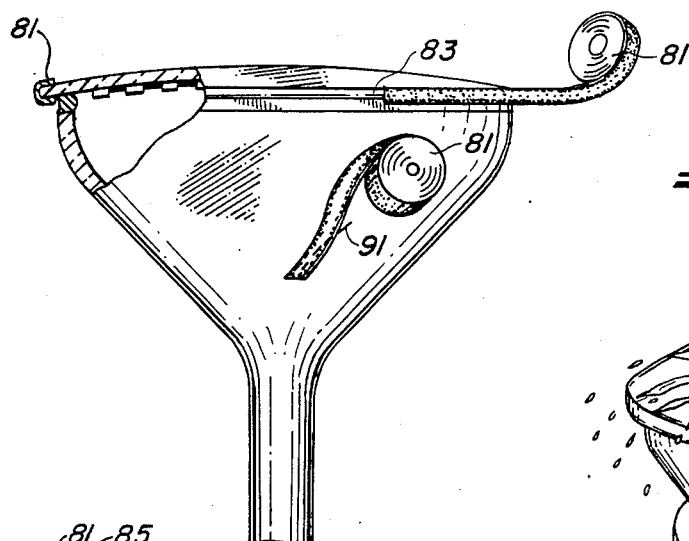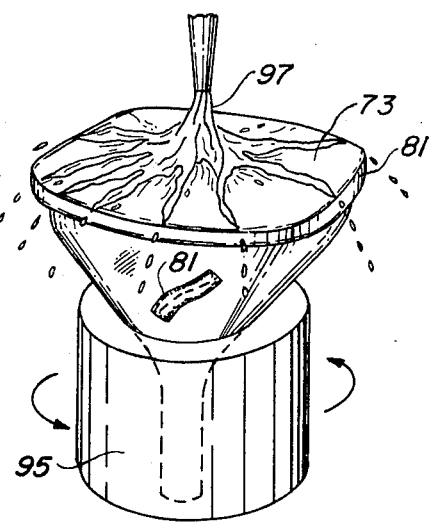

METHOD FOR REDUCING THERMALLY INDUCED FRACTURE OF CATHODE RAY TUBE BULBS DURING SALVAGE

CROSS-REFERENCE TO RELATED APPLICATION

This application is a division of copending application Ser. No. 430,828, filed Jan. 4, 1974, (now U.S. Pat. No. 3,894,858) assigned to the assignee of the present application.

BACKGROUND OF THE INVENTION

This invention is concerned with reducing occurrences of breakage of television cathode ray tube glass bulbs and bulb components resulting from various temperature changes introduced in salvage processes.

Color television cathode ray tube bulbs include two major components (i) a glass front panel for, among other things, supporting arrays of cathodo-luminescent phosphor deposits and (ii) a glass funnel member whose large end is eventually sealed to the face panel and whose small end houses at least one electron beam source. Black and white television cathode ray tube bulbs, although taking on the same basic final exterior appearance as color bulbs, do not comprise separate components, but rather are produced as a single integral unit.

During a typical tube salvage operation the bulb is subjected to a thermal shock which is intended to break the frit seal, However, frequently the bulb, particularly the front panel itself, is fractured in the process.

PRIOR ART

U.S. Pat. No. 3,390,033 — M. K. Brown

OBJECT OF THE INVENTION

It is an object of this invention to provide a method for salvaging color CRT's which results in a decreased number of bulb fractures.

BRIEF DESCRIPTION OF THE DRAWINGS

FIGS. 1, 1A and 2 show a cathode ray tube bulb, and enlarged partial section thereof, during manufacture in accordance with one application of the invention of the referent parent application;

FIGS. 3 and 4 are side views of a skirted front panel, in process in accordance with another application of the invention of the parent application;

FIGS. 5 and 6 are side views of a cathode ray tube bulb in process in accordance with still another application of the invention of the parent application; and FIGS. 7, 7A, 8, 8A, 9 and 10 are side and perspective views of cathode ray tube bulb in process in accordance with a salvage application of the principles of this invention.

DESCRIPTION OF THE PREFERRED EMBODIMENT

As pointed out above, cathode ray tube glass bulbs and bulb components are subjected to numerous temperature cycles during manufacture which produce tension modes in the glass and many times cause it to fracture, particularly if the glass has some exposed surface areas of especially low tensile strength. The drawings and examples below demonstrate specific preferred implementations of the inventive principles of the parent application and of this application for reducing the likelihood of such thermally induced fracture of cathode ray tube glass bulbs and bulb components.

EXAMPLE 1

FIGS. 1, 1A and 2 show an application of the inventive principles of the parent application to reducing likelihood of fracture of a non-skirted glass front panel due to temperature cycling encountered in evacuating a cathode ray tube glass bulb. The process of bulb evacuation is commonly referred to as the thermal exhaust cycle. FIG. 1 shows a cathode ray tube glass bulb 11 comprising a non-skirted glass front panel 13 joined to a glass funnel 15 by means of frit material 17. Prior to heating, a thermal insulator 19, shown in FIGS. 1 and 1A, is applied to the front panel extreme border surface 21 so as to cover the extreme border surface and slightly overlap onto adjoining front panel top and bottom surfaces 23, 25. The amount of overlap is not critical; satisfactory results have been obtained with an overlap onto the top surface of about one-fourth to one-half inch and onto the bottom surface of about one-fourth to one-half inch.

Although any surface-conformable insulator of sheet or other form capable of withstanding approximately 420° C is satisfactory, a single layer of asbestos paper approximately 0.015 inch thick is presently preferred for use as the thermal insulator. Before application, which may be manual, the paper is first water moistened to assure that it conforms to the extreme border surface and adjacent surface.

Other ways of, and materials for, thermally insulating the surfaces of concern are possible and may be more suitable for certain mass production purposes. For instance, a belt or "doughnut" could be pre-formed to encircle the panel, and grooved or channeled at its inner periphery so as to mate with the panel extreme border in a fashion similar to that of the applied asbestos paper shown in FIGS. 1, 1A and 2. The belt could be split at one or more points and employ a buckle at each split for cinching. Materials suitable for such preformed insulations are varied and include: (i) fiberglass, (ii) a vermiculite composition employing an appropriate binder.

As shown in FIG. 2 the bulb with extreme border-applied-insulator is then evacuated while being subjected to approximately 420° C. After completing the evacuation and bulb sealing, the temperature is decreased in stages until bulb temperature, as measured at a non-thermally-insulated bulb surface, reaches about 180° C. The bulb is then removed from the heat and permitted to cool in room ambient conditions. After cooling is completed, the thermal insulator is removed and remaining manufacturing processes continued.

Although the process described in this example has been particularly described in relation to the thermal exhaust cycle, it should be apparent that the same process is applicable whenever a non-skirted front panel is subjected to high temperatures and subsequently cooled. Specifically, other examples of the above described process application include employing the thermal insulator on the front panel extreme border during compaction and cool down, during bake-out and cool down, and during frit sealing and cool down.

EXAMPLE 2

This example involves bake-out of a more conventional skirted front panel; this application is quite similar in many ways to that of Example 1. FIG. 3 shows a skirted front panel 31 including a previously applied phosphor screen 33. At this stage of manufacture, before frit sealing to a funnel, the panel seal land 35 is exposed and subject to similar breakage problems as the non-skirted front panel extreme border surface of Example 1.

As shown in FIG. 3, prior to bake-out heating, a thermal insulator 37 is applied to the front panel seal land 35 so as to cover the seal land and slightly overlap onto adjoining inside 39 and outside 41 skirt surfaces. Again, the amount of overlap is not critical but, it is believed that for best results, the insulator 37 should usually extend onto the skirt surfaces about one-fourth to one-half inch. Although any surface-conformable insulator capable of withstanding approximately 420° C satisfactory, a single layer of asbestos paper approximately 0.015 inch thick is presently preferred for use as the thermal insulator in this application also. Before application, which is presently manual, the paper is first water moistened to assure that it conforms to seal land and adjacent surfaces. As in Example 1, other ways of and materials for, insulating may be employed. For instance, in the present example and insulating and seal-land-mating mold could be pre-formed roughly in the shape which the insulating paper takes in FIGS. 3 and 4. The panel and mold could be quickly mated.

As shown in FIG. 4, the front panel with the insulator 37 applied to the seal land 35 is then baked at temperatures up to approximately 420° C so as to drive out volatile materials. After completing the bake-out, the temperature is decreased in stages until panel temperature, as measured at a non-thermally-insulated panel surface reaches about 180° C. The panel is then removed from the heat and permitted to cool in room ambient conditions. After cooling is completed and thermal insulator is removed and remaining manufacturing processes continued.

Although the process described in this example has been particularly described in relation to the temperature cycling associated with panel bake-out, it should be apparent that the same process is applicable whenever a skirted front panel having an exposed seal land is subjected to high temperatures and subsequently cooled. Specifically, another example of the above described process application includes employing the thermal insulator on the front panel seal land during compaction and cool down.

EXAMPLE 3

FIGS. 5 and 6 represent an application of the inventive principles of the referent parent application to reducing likelihood of skirt-related and heel radius-related fractures due to temperature cycling of a skirted face panel. The figures show a skirted face panel 51 joined to a glass funnel 53 by means of a frit material 55 and thus specifically represent the use of the following procedure in temperature cycling processes occurring during or subsequent to component joining, such as frit sealing and thermal exhaust evacuation. However, the procedure is equally applicable to temperature cycling processes occurring prior to component joining, such as compaction and bake-out. Moreover, since black and white bulbs possess similar surface areas, the procedure is also applicable to these bulbs during bake-out and exhaust cycle.

As shown in FIG. 5, prior to heating, a thermal insulator 57 is applied to the upper skirt and heel radius exterior surfaces, 59 and 61, by forming a belt of the insulator around the upper skirt which slightly overlaps onto the adjoining heel radius exterior surface 61. Although any surface-conformable insulator capable of withstanding approximately 420° C is satisfactory, again a single layer of asbestos paper approximately 0.015 inch thick is presently preferred for use as the thermal insulator. Before application, which may be manual, the paper is first water moistened to assure that it conforms to skirt and heel radius exterior surfaces. As in Example 1, other forms of insulating are contemplated. A pre-formed mold, of appropriate insulative material, resembling the FIG. 6 insulator application and conforming to the surfaces as illustrated in FIGS. 5 and 6 could replace the asbestos paper.

As shown in FIG. 6, the panel including the insulator belt is then subjected to approximately 420° C. Afterwards the temperature is decreased in stages until glass temperature, as measured at a non-thermally-insulated glass surface, reaches about 180° C. The bulb is then removed from the heat and permitted to cool in room ambient conditions. After cooling is completed the thermal insulator is removed and remaining manufacturing processes continued.

EXAMPLE 4

FIGS. 7 through 10 illustrate an application of the principles of the present invention to reducing the likelihood of fracture of non-skirted glass front panel and attached glass funnel due to temperature cycling associated with salvaging components of a cathode ray tube glass bulb having a discrete faceplate or front panel. Specifically depicted is a novel method of separating a non-skirted front panel frit sealed to a funnel.

FIG. 7 shows a cathode ray tube glass bulb 71 comprising a non-skirted glass front panel 73 joined to a glass funnel 76 by means of a frit material 77. As shown in FIG. 7, and particularly in the FIG. 7A magnified view, the frit seal includes an outer bead portion 78 and an inner bead portion 79.

To separate the two glass components, first, as shown in FIG. 7, the outer bead portion 78 is removed, preferably by acid etching. When the outer bead portion is removed, as shown in FIG. 8, a thermal insulator 81 is applied according to this invention to the front panel extreme border surface 83 so as to cover the extreme border surface and slightly overlap onto adjoining front panel top 85 and bottom 87 surfaces. See FIG. 8A. The amount of overlap is not critical but satisfactory results have been obtained with the insulator extending onto the top surface about one-fourth to one-half inch and onto the bottom surface about one-fourth to one-half inch. Visual bulb surface defects, such as the scratch 91 illustrated on the funnel surface, may also be covered with patches comprising strips of the thermal insulator 81. Although any surface conformable insulator capable of withstanding approximately 80° C is satisfactory, several layers of a fabric base adhesive tape is presently preferred for use as the thermal insulator. Other means of providing such insulation are contemplated. For instance, a large elastic or rubber band could be stretched around the panel periphery and would naturally conform to the surfaces of concern, providing the requisite insulation.

As shown in FIG. 9 the bulb 71 including the applied insulator 81 is then heated to between approximately 50° C and 80° C. While at this temperature the bulb is mounted vertically, as shown in FIG. 10, with the front panel 73 in the up position preferably on a rotatable table 95. A fluid 97 at approximately 10° to 20° C is then flowed in the downward direction onto the front panel, preferably while the turntable is rotating. The thermal shock results in a fracture of the frit material. Following fracture of the frit material, fluid flow is stopped. Once the entire bulb has cooled sufficiently, the thermal insulator is removed and remaining manufacturing processes continued.

Although the process described in this example has been particularly described in relation to bulbs including a non-skirted front panel, it should be apparent that the part of the process applicable to covering visual surface defects, such as scratch 91, in independent of the front panel shape and is thus applicable to salvage processes according to this invention in which one of the bulb components is a conventional skirted front panel.

In each of the above examples, the likelihood of fracture is reduced without increasing the cooling period. In some instances both a reduction in frequency of fracture and a reduction of cooling period may be achieved. A common rationale underlies the results achieved in all examples. When the glass is cooled, following any of the desired heating processes, the exposed surfaces normally cool faster than the glass interior. Temperature gradients are produced between the surfaces and the interior of the glass. In the panel extreme border surface examples, the thermal gradient of concern is between the extreme border surface and the interior of the glass panel. In the other examples, such as funnel exterior surface and skirt and heel radius surfaces, the gradient of concern is through-wall. These temperature gradients in turn generate tensile forces at the glass surface. Glass, even when perfect and homogeneous, is weak in the tension mode, but is particularly susceptible to fracture due to these tensile forces if it has some surface area of especially low tensile strength such as a scratch or other visual defect. For instance, even minute visual defects at the extreme border surface of a non-skirted face panel will, on cooling from high temperatures, result in fracture due to circumferential tension at the panel periphery.

Application of the thermal insulator over the susceptible surface prior to cooling locally reduces the rate of cooling and consequently locally reduces the cooling-/induced tensile forces. The result is reduced likelihood of glass fracture. The major portion of the bulb or bulb component remains uninsulated and continues to cool at a normal rate which depends on the surrounding conditions. In fact since many of the temperature cycle periods are designed to accommodate the susceptible surfaces, insulating the surfaces during cooling can permit shorter thermal cycles.

It is to be understood that the above-described examples are merely illustrative of the application of the principles of the invention. Numerous other arrangements may be readily devised by those skilled in the art which will embody the principles of the invention and fall within the spirit and scope thereof.

What is claimed is:

1. In a television cathode ray tube manufacturing process of separating a nonskirted glass front panel and a glass funnel sealed together with a glass frit material wherein the glass exterior surfaces are successively heated and cooled in order to fracture the frit seal by thermal shock wherein, during cooling, a temperature gradient is established between (i) a relatively rapidly cooling exterior surface area of an extreme border of the front panel and (ii) a more slowly cooling interior portion of the border, a method for reducing the circumferential tension produced at the front panel extreme border by said temperature gradient to thus lessen the likelihood of front panel fracture, said method comprising applying prior to or during said cooling a thermal insulator over the front panel extreme border and vicinity so as to locally reduce the rate of glass surface cooling and thus the thermally-induced tensile forces at said glass surface.

2. A process as defined in claim 1 wherein said application of thermal insulator comprises application of at least one layer of a fabric-base adhesive tape.

3. In a television cathode ray tube manufacturing process of separating a glass front panel and a glass funnel wherein said front panel and funnel having a visual defect on an exterior surface either the front panel or funnel, said front panel and funnel sealed together with a glass frit material wherein the glass exterior surfaces are heated then cooled thus producing a through-wall temperature gradient between the glass exterior surface and the more remote inner portions of the glass panel and funnel which in turn produces tensile forces at the glass exterior surfaces, a method for reducing these tensile forces in the vicinity of visual defects on the exterior of the glass surfaces to thus lessen the likelihood of glass fracture and thus improve yield, said method comprising applying prior to or during said cooling a thermal insulator over the glass surface visual defects and vicinity so as to locally reduce the rate of glass surface cooling and thus the thermally-induced tensile forces at said glass surface.

4. The process as defined in claim 3 wherein said application of thermal insulator comprises application of at least one layer of a fabric-base adhesive tape.

5. A method of separating two glass components of a cathode ray tube bulb wherein said glass components have a visual defect on an exterior surface on either component, said components being sealed together with a glass frit material, wherein the glass exterior surfaces are successively heated and cooled and wherein, during cooling, a temperature gradient is established between (i) a relatively rapidly cooling exterior surface area an extreme border of the front panel and (ii) a more slowly cooling interior portion of the border, said method including locally reduced cooling-induced tensile forces in the vicinity of visual glass surface defects of especially low tensile strength to thus lessen the likelihood of glass component fracture during the process of separation, said method comprising:
  removing the outer bead portion of said frit material;
  applying a thermal insulator over visual bulb exterior surface defects and vicinity;
  heating the bulb to a predetermined elevated temperature substantially above room temperature;
  cooling the bulb exterior surface by applying a fluid having a predetermined second temperature substantially below said predetermined elevated temperature to the bulb exterior surface so as to fracture the frit material.

6. The method defined by claim 5 wherein said elevated temperature is approximately 50° to 80° C and wherein said predetermined second temperature is approximately 10° to 20° C.

7. A method of separating two components of a cathode ray tube bulb comprising a non-skirted glass front panel and a glass funnel sealed together with a glass frit material wherein the glass exterior surfaces are successively heated and cooled, and wherein, during cooling, a temperature gradient is established between (i) a relatively rapidly cooling exterior surface area of an extreme border of the front panel and (ii) a more slowly cooling interior portion of the border, said method including locally reducing cooling-induced circumferential tension at the front panel extreme border and vicinity due to the thermally-induced tensile forces to thus lessen the likelihood of front panel fracture during the process of separation, said method comprising:

removing the outer bead portion of said frit material;
applying a thermal insulator over the front panel extreme border and vicinity;

heating the bulb to a predetermined elevated temperature substantially above room temperature;
mounting the bulb vertically with the front panel in the up position;
cooling the glass exterior surface by flowing a fluid having a predetermined second temperature substantially below said predetermined elevated temperature in the downward direction onto said first panel so as to fracture the frit material.

8. The method defined by claim 7 wherein said elevated temperature is approximately 50° to 80° C and wherein said predetermined second temperature is approximately 10° and 20° C.

* * * * *

PO-1050
(5/69)

UNITED STATES PATENT OFFICE
CERTIFICATE OF CORRECTION

Patent No. 3,988,136          Dated   Oct. 26, 1976

Inventor(s) Melvin F. Rogers

It is certified that error appears in the above-identified patent and that said Letters Patent are hereby corrected as shown below:

IN THE SPECIFICATION
       In column 4, line 37, "76" should be --75--; and

IN THE CLAIMS

In column 8, line 9, "first" should be --front--.

*Signed and Sealed this*

Twenty-second *Day of* February 1977

[SEAL]

*Attest:*

RUTH C. MASON
*Attesting Officer*

C. MARSHALL DANN
*Commissioner of Patents and Trademarks*